US012713246B2

(12) United States Patent
Medles et al.

(10) Patent No.: US 12,713,246 B2
(45) Date of Patent: Aug. 18, 2026

(54) CONFIGURATION OF SPECTRUM SHARING BETWEEN TERRESTRIAL AND NON-TERRESTRIAL NETWORKS

(71) Applicant: MediaTek Singapore Pte. Ltd., Singapore (SG)

(72) Inventors: Abdelkader Medles, Cambridge (GB); Shiang-Jiun Lin, Hsinchu City (TW); Gilles Charbit, Cambridge (GB); I-Kang Fu, Hsinchu City (TW)

(73) Assignee: MEDIATEK SINGAPORE PTE. LTD., Singapore (SG)

( * ) Notice: Subject to any disclaimer, the term of this patent is extended or adjusted under 35 U.S.C. 154(b) by 275 days.

(21) Appl. No.: 18/254,393

(22) PCT Filed: Nov. 19, 2021

(86) PCT No.: PCT/CN2021/131651
§ 371 (c)(1),
(2) Date: May 25, 2023

(87) PCT Pub. No.: WO2022/111384
PCT Pub. Date: Jun. 2, 2022

(65) Prior Publication Data

US 2024/0022913 A1 Jan. 18, 2024

Related U.S. Application Data

(60) Provisional application No. 63/118,755, filed on Nov. 27, 2020.

(51) Int. Cl.

| | |
|---|---|
| ***H04W 16/14*** | (2009.01) |
| ***H04L 5/14*** | (2006.01) |
| *H04W 84/06* | (2009.01) |

(52) U.S. Cl.
CPC ............... *H04W 16/14* (2013.01); *H04L 5/14* (2013.01); *H04W 84/06* (2013.01)

(58) Field of Classification Search
CPC ...... H04B 7/18513; H04L 5/14; H04W 16/14; H04W 84/06
See application file for complete search history.

(56) References Cited

U.S. PATENT DOCUMENTS

| | | |
|---|---|---|
| 10,848,237 B1 | 11/2020 | Sorond et al. |
| 2002/0041575 A1 | 4/2002 | Karabinis |

(Continued)

FOREIGN PATENT DOCUMENTS

| | | |
|---|---|---|
| CN | 103997367 A | 8/2014 |
| CN | 105208564 A | 12/2015 |
| CN | 111342947 A | 6/2020 |

OTHER PUBLICATIONS

International Search Report dated Feb. 9, 2022, issued in application No. PCT/CN2021/131651.

(Continued)

*Primary Examiner* — Mansour Oveissi
*Assistant Examiner* — David M Oveissi
(74) *Attorney, Agent, or Firm* — McClure, Qualey & Rodack, LLP

(57) ABSTRACT

Solutions pertaining to configuration of spectrum sharing between a terrestrial network (TN) and a non-terrestrial network (NTN) are proposed. An apparatus implemented in a UE communicates with a non-terrestrial (NT) network node of the NTN by resource sharing with the TN. The resource sharing involves resource sharing with pairing of uplink (UL) and downlink (DL) transmissions of the NTN and the TN.

18 Claims, 9 Drawing Sheets

COMMUNICATE, BY A PROCESSOR OF A USER EQUIPMENT (UE), WITH A NON-TERRESTRIAL (NT) NETWORK NODE OF A NON-TERRESTRIAL NETWORK (NTN) BY RESOURCE SHARING WITH A TERRESTRIAL NETWORK (TN) BY RESOURCE SHARING WITH PAIRING OF UPLINK (UL) AND DOWNLINK (DL) TRANSMISSIONS OF THE NTN AND THE TN SUCH THAT:

- AN NTN DL TRANSMISSION AND A TN UL TRANSMISSION SHARE A FIRST RESOURCE; AND
- A NTN UL TRANSMISSION AND A TN DL TRANSMISSION SHARE A SECOND RESOURCE

910

(56) References Cited

U.S. PATENT DOCUMENTS

| | | | | |
|---|---|---|---|---|
| 2003/0078040 | A1 | 4/2003 | Mayfield | |
| 2006/0199532 | A1 | 9/2006 | Soliman | |
| 2007/0232298 | A1 | 10/2007 | Karabinis | |
| 2011/0263199 | A1 | 10/2011 | Cruz et al. | |
| 2017/0272131 | A1* | 9/2017 | Ananth | H04B 7/0413 |
| 2019/0245590 | A1* | 8/2019 | Singh | H01Q 3/2611 |
| 2020/0052782 | A1* | 2/2020 | Wang | H04B 7/18541 |

OTHER PUBLICATIONS

Extended European Search Report dated Jun. 6, 2024, issued in application No. EP 21896885.7.

Cheng, K.W., et al.; "Analysis of interferences from ATN terminals to uplink satellite users in integrated satellite and terrestrial systems;" Electronic Design Engineering; vol. 24; No. 10; May 2016; pp. 142-146 (English language translation of abstract, p. 1 of publication).

Panasonic; "UL Timing Advance and Frequency Synchronization for Ntn;" 3GPP TSG RAN WG1 #102e; Aug. 2020; pp. s1-4.

* cited by examiner

200

LEGACY SYSTEM

| SYSTEM | BAND | NAME | MODE | MODE | | | BANDWIDTH DL/UL (MHz) | UPLINK (MHz) | | | DUPLEX SPACING (MHz) |
|---|---|---|---|---|---|---|---|---|---|---|---|
| | | | | LOW | MIDDLE | HIGH | | LOW | MIDDLE | HIGH | |
| | | | | EARFCN | | | | EARFCN | | | |
| TN | 24 | 1600 L-BAND | FDD | 1525 7700 | 1542 7870 | 1559 8039 | 34 | 1626.5 25700 | 1643.5 25870 | 1660.5 26039 | -101.5 |

EXAMPLES OF NTN SYSTEM WITH NTN FREQUENCY BAND SPECIFICATION

| SYSTEM | BAND | NAME | MODE | MODE | | | BANDWIDTH DL/UL (MHz) | UPLINK (MHz) | | | DUPLEX SPACING (MHz) |
|---|---|---|---|---|---|---|---|---|---|---|---|
| | | | | LOW | MIDDLE | HIGH | | LOW | MIDDLE | HIGH | |
| | | | | **NTN-ARFCN** | | | | EARFCN | | | |
| NTN | **24' (X)** | 1600 L-BAND | FDD | 1626.5 Y | 1643.5 **Y+170** | 1660.5 **Y+339** | 34 | 1525 **Z** | 1542 **Z+170** | 1559 **Z+339** | 101.5 |

NTN System using Band 24

| System | Band | Name | Mode | Mode | | | Bandwidth DL/UL (MHz) | Uplink (MHz) | | | Duplex Spacing (MHz) |
|---|---|---|---|---|---|---|---|---|---|---|---|
| | | | | Low | Middle | High | | Low | Middle | High | |
| | | | | EARFCN | | | | EARFCN | | | |
| NTN | 24 | 1600 L-Band | FDD | 1525 7700 | 1542 7870 | 1559 8039 | 34 | 1626.5 25700 | 1643.5 25870 | 1660.5 26039 | -101.5 |

Examples of TDD TN legacy system with partial sharing of NTN Frequency Allocation

| System | Band | Name | Mode | Mode | | | Bandwidth DL/UL (MHz) | Uplink (MHz) | | | Duplex Spacing (MHz) |
|---|---|---|---|---|---|---|---|---|---|---|---|
| | | | | Low | Middle | High | | Low | Middle | High | |
| | | | | EARFCN | | | | EARFCN | | | |
| TN | **24' (X)** | 1600 L-Band | TDD | 1525.5 Y | 1542 **Y+170** | 1559 **Y+339** | 34 | 1525 **Z** | 1542 **Z+170** | 1559 **Z+339** | N/A |

FIG. 5

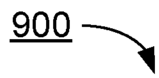

COMMUNICATE, BY A PROCESSOR OF A USER EQUIPMENT (UE), WITH A NON-TERRESTRIAL (NT) NETWORK NODE OF A NON-TERRESTRIAL NETWORK (NTN) BY RESOURCE SHARING WITH A TERRESTRIAL NETWORK (TN) BY RESOURCE SHARING WITH PAIRING OF UPLINK (UL) AND DOWNLINK (DL) TRANSMISSIONS OF THE NTN AND THE TN SUCH THAT:

- AN NTN DL TRANSMISSION AND A TN UL TRANSMISSION SHARE A FIRST RESOURCE; AND
- A NTN UL TRANSMISSION AND A TN DL TRANSMISSION SHARE A SECOND RESOURCE

CONFIGURATION OF SPECTRUM SHARING BETWEEN TERRESTRIAL AND NON-TERRESTRIAL NETWORKS

CROSS REFERENCE TO RELATED PATENT APPLICATION

The present disclosure is part of a non-provisional application claiming the priority benefit of U.S. Provisional Patent Application No. 63/118,755, filed on 27 Nov. 2020, the content of which being incorporated by reference in its entirety.

TECHNICAL FIELD

The present disclosure is generally related to mobile communications and, more particularly, to configuration of spectrum sharing between a terrestrial network (TN) and a non-terrestrial network (NTN).

BACKGROUND

Unless otherwise indicated herein, approaches described in this section are not prior art to the claims listed below and are not admitted as prior art by inclusion in this section.

In wireless communications such as mobile communications according to the 3rd Generation Partnership Project (3GPP) specifications, spectrum sharing refers to two systems sharing the same carriers. For instance, in the context of TN-NTN spectrum sharing, the TN can reuse the same spectrum used by the NTN. This can free up a lot of spectrum for TN reuse. One challenge, however, is TN-to-NTN interference. Additionally, it is noteworthy that NTN satellite power on the ground tends to be relatively small. That is, NTN (e.g., satellite) power reaching a TN user equipment (UE) is typically significantly low (e.g., close to thermal noise floor) for most UEs that are within TN coverage. NTN UEs are expected to be outside of TN coverage, and thus the level of interference on TN network from NTN UEs tends to be low. On the other hand, one main challenge is TN interference on uplink (UL) transmissions from a NTN UE to a satellite. As a satellite beam can cover large areas, aggregate TN interference on NTN UL transmissions can be very high. Moreover, due to geographical separation, TN interference on downlink (DL) transmissions to NTN UEs tends to be less problematic. Therefore, there is a need for a solution for configuration of spectrum sharing between a TN and a NTN to address aforementioned issues.

SUMMARY

The following summary is illustrative only and is not intended to be limiting in any way. That is, the following summary is provided to introduce concepts, highlights, benefits and advantages of the novel and non-obvious techniques described herein. Select implementations are further described below in the detailed description. Thus, the following summary is not intended to identify essential features of the claimed subject matter, nor is it intended for use in determining the scope of the claimed subject matter.

An objective of the present disclosure is to propose solutions or schemes that address the aforementioned issues. More specifically, various schemes proposed in the present disclosure pertain to configuration of spectrum sharing between a TN and a NTN.

In one aspect, a method may involve a UE communicating with a non-terrestrial (NT) network node of an NTN by resource sharing with a TN. The resource sharing may involve resource sharing with pairing of UL and DL transmissions of the NTN and the TN.

In another aspect, an apparatus may include a transceiver and a processor coupled to the transceiver. The transceiver may be configured to communicate wirelessly. The processor may communicate, via the transceiver, with an NT network node of an NTN by resource sharing with a TN. The resource sharing may involve resource sharing with pairing of UL and DL transmissions of the NTN and the TN.

It is noteworthy that, although description provided herein may be in the context of certain radio access technologies, networks and network topologies such as TN and NTN, the proposed concepts, schemes and any variation(s)/derivative(s) thereof may be implemented in, for and by other types of radio access technologies, networks and network topologies such as, for example and without limitation, Long-Term Evolution (LTE), LTE-Advanced, LTE-Advanced Pro, 5th Generation (5G), New Radio (NR), Internet-of-Things (IoT), Narrow Band Internet of Things (NB-IoT), Industrial Internet of Things (IIoT). Thus, the scope of the present disclosure is not limited to the examples described herein.

BRIEF DESCRIPTION OF THE DRAWINGS

The accompanying drawings are included to provide a further understanding of the disclosure and are incorporated in and constitute a part of the present disclosure. The drawings illustrate implementations of the disclosure and, together with the description, serve to explain the principles of the disclosure. It is appreciable that the drawings are not necessarily in scale as some components may be shown to be out of proportion than the size in actual implementation in order to clearly illustrate the concept of the present disclosure.

FIG. 2 is a diagram of an example scenario under a proposed scheme in accordance with the present disclosure.

FIG. 5 is a diagram of an example scenario under a proposed scheme in accordance with the present disclosure.

FIG. 9 is a flowchart of an example process in accordance with an implementation of the present disclosure.

DETAILED DESCRIPTION OF PREFERRED IMPLEMENTATIONS

Detailed embodiments and implementations of the claimed subject matters are disclosed herein. However, it shall be understood that the disclosed embodiments and implementations are merely illustrative of the claimed subject matters which may be embodied in various forms. The present disclosure may, however, be embodied in many different forms and should not be construed as limited to the exemplary embodiments and implementations set forth herein. Rather, these exemplary embodiments and implementations are provided so that description of the present disclosure is thorough and complete and will fully convey the scope of the present disclosure to those skilled in the art. In the description below, details of well-known features and techniques may be omitted to avoid unnecessarily obscuring the presented embodiments and implementations.

Overview

Implementations in accordance with the present disclosure relate to various techniques, methods, schemes and/or solutions pertaining to configuration of spectrum sharing between a TN and a NTN. According to the present disclosure, a number of possible solutions may be implemented separately or jointly. That is, although these possible solutions may be described below separately, two or more of these possible solutions may be implemented in one combination or another.

Figure 1:
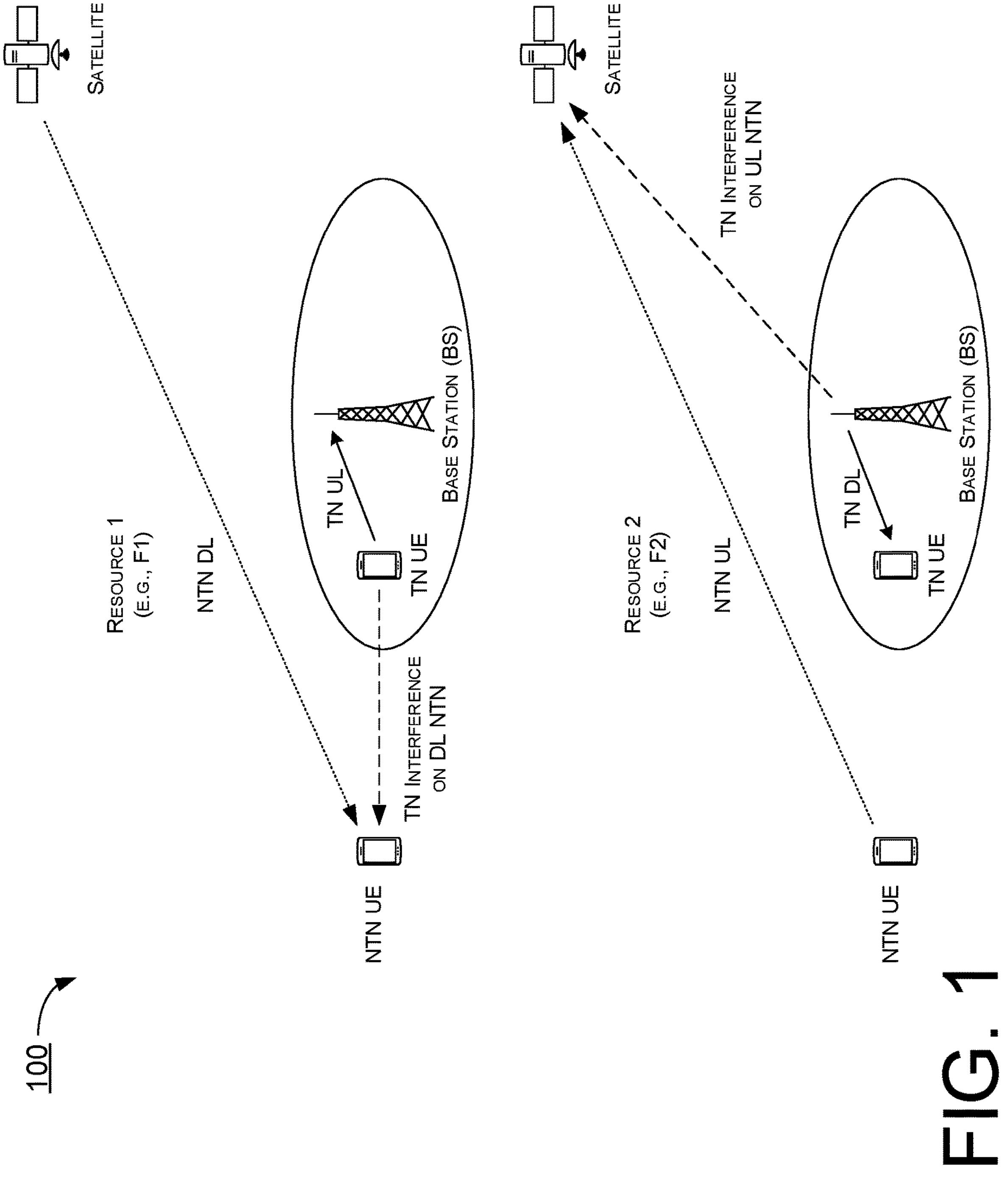
FIG. 1 is a diagram of an example scenario under a proposed scheme in accordance with the present disclosure.

FIG. 1 illustrates an example scenario 100 under a proposed scheme with respect to DL-UL reverse pairing in accordance with the present disclosure. Under the proposed scheme, NTN DL transmissions and TN UL transmissions may share the same resources. Conversely, NTN UL transmissions and TN DL transmissions may share the same resources. The resources may include time resource(s) (e.g., frame(s), slot(s), symbol(s), and so on) and/or frequency resource(s) (e.g., bandwidth part(s) (BWP(s)), resource block(s), frequency band(s), and so on).

In case of frequency-division duplexing (FDD), a first frequency in FDD (herein interchangeably referred to as "FDD F1") may be used for NTN DL transmissions and TN UL transmissions, and a second frequency in FDD (herein interchangeably referred to as "FDD F2") may be used for NTN UL transmissions and TN DL transmissions. Under the proposed scheme, two frequency bands may be defined for the same pair TN/NTN. For instance, a first frequency band (Band 1) may be defined for NTN, with DL transmissions on F1 and UL transmissions on F2. Similarly, a second frequency band (Band 2) may be defined for TN, with DL transmissions on F2 and UL transmissions on F1. Moreover, reverse pairing may apply as well to partial overlapping of the UL/DL bands.

On NTN DL transmissions, the interference experienced by a UE may come from other TN UEs. This may not necessarily be a problem, as the power of TN UE tends to be limited and NTN coverage is for isolated areas where TN coverage is limited. On NTN UL transmissions, the interference experienced by a satellite may come from a base station (BS) of the TN. This interference may be limited or otherwise mitigated by design with different techniques. Specific types or categories of TN BS that can support this type of pairing may be defined in order to respect the TN DL (and NTN UL) constraints. That is, the TN BS may be configured to support NTN-TN spectrum sharing on reverse pairing frequency bands under the proposed scheme.

FIG. 2 illustrates an example scenario 200 under a proposed scheme with respect to DL-UL reverse pairing in accordance with the present disclosure. Specifically, FIG. 2 shows an illustrative and non-limiting example of application of the concept of DL-UL reverse pairing for TN and NTN. Under the proposed scheme, NTN frequency tables may be specified to support NTN system operation. Additionally, NTN band 24' (also known as NTN band X) may share the DL-UL reverse pairing of TN Evolved Universal Mobile Telecommunications System (UMTS) Terrestrial Radio Access (E-UTRA) Absolute Radio Frequency Channel Number (EARFCN) band 24. That is, the DL frequency of NTN may share the same UL frequency of TN, and the UL frequency of NTN may share the same DL frequency of TN. Moreover, NTN absolute radio-frequency channel number (NTN-arfcn) may be specified NTN DL channels and UL channels. That is, NTN-arfcn may share similar numbering relationships for TN-arfcn for DL and UL channels. Furthermore, NTN and legacy systems may include, but are not limited to, 2$^{nd}$ Generation (2G), 3$^{rd}$ Generation (3G), 4$^{th}$ Generation (4G) Long-Term Evolution (LTE), and 5$^{th}$ Generation (5G) New Radio (NR). The signaling of NTN frequency band indication may be in accordance with NTN frequency band specification.

Figure 3:
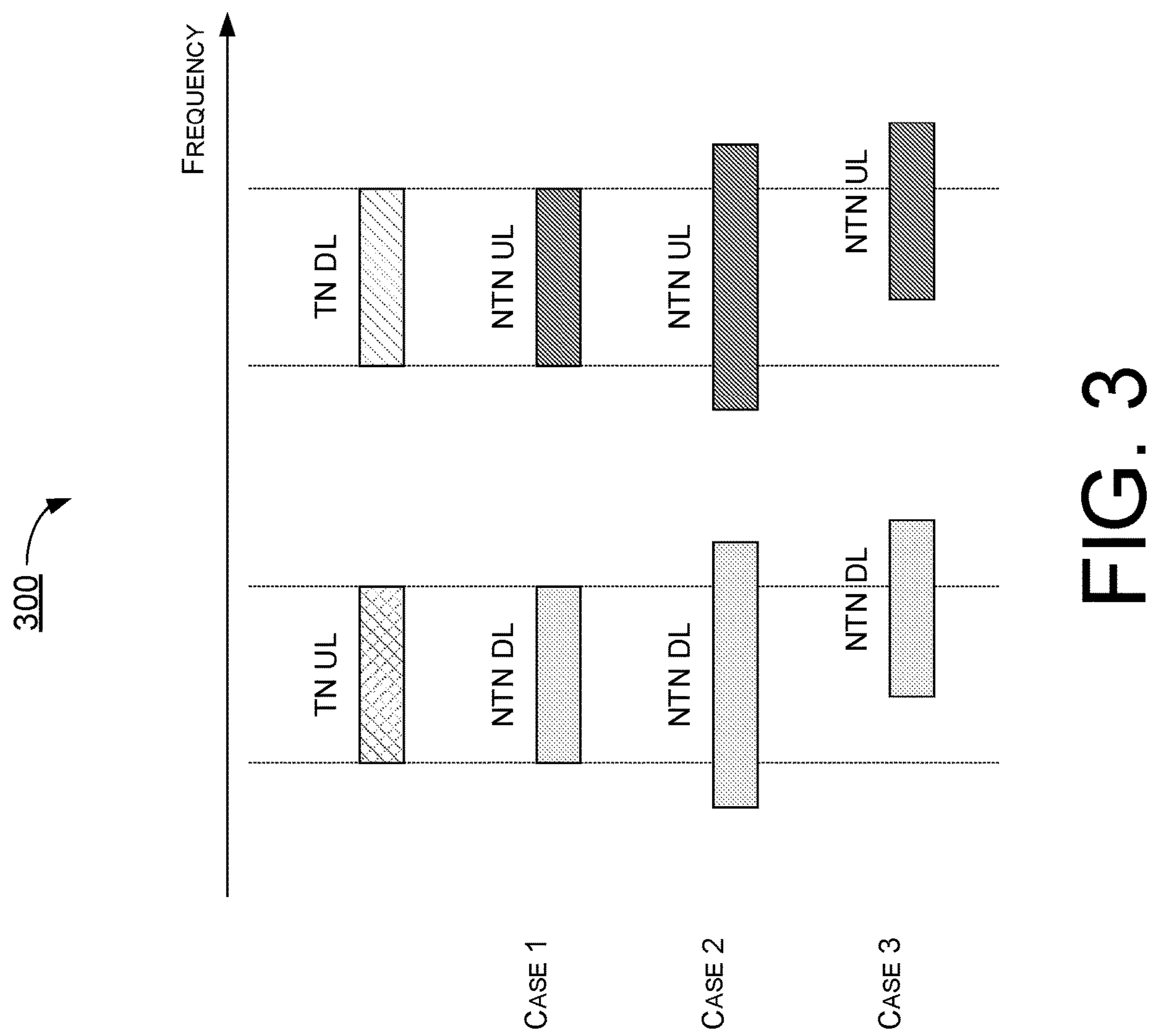
FIG. 3 is a diagram of an example scenario under a proposed scheme in accordance with the present disclosure.

FIG. 3 illustrates an example scenario 300 under a proposed scheme with respect to partial-band overlapping configuration in accordance with the present disclosure. Under the proposed scheme, the frequency bandwidth used for DL-UL transmissions of the reverse pairing between TN and NTN may be identical although the frequency bandwidth may as well be partially overlapping as shown in FIG. 3. In scenario 300, three cases of partial overlapping are shown as illustrative examples. In a first case (Case 1), TN and NTN have the same frequency allocation but with DL and DL reversed. In a second case (Case 2), TN and NTN have different frequency allocations but with TN frequency allocation fully overlapped by the NTN frequency allocation (and with NTN frequency allocation partially overlapped by TN frequency allocation). It is noteworthy that an inverse scenario, in which NTN frequency allocation is fully overlapped by the TN frequency allocation, is also possible. In a third case (Case 3), TN frequency allocation is partially overlapped by the NTN frequency allocation. Under the proposed scheme, the different configurations of overlapping and bandwidth sizes may lead to different bands defined for the reverse pairing of DL-UL covering the same frequency range.

Figure 4:
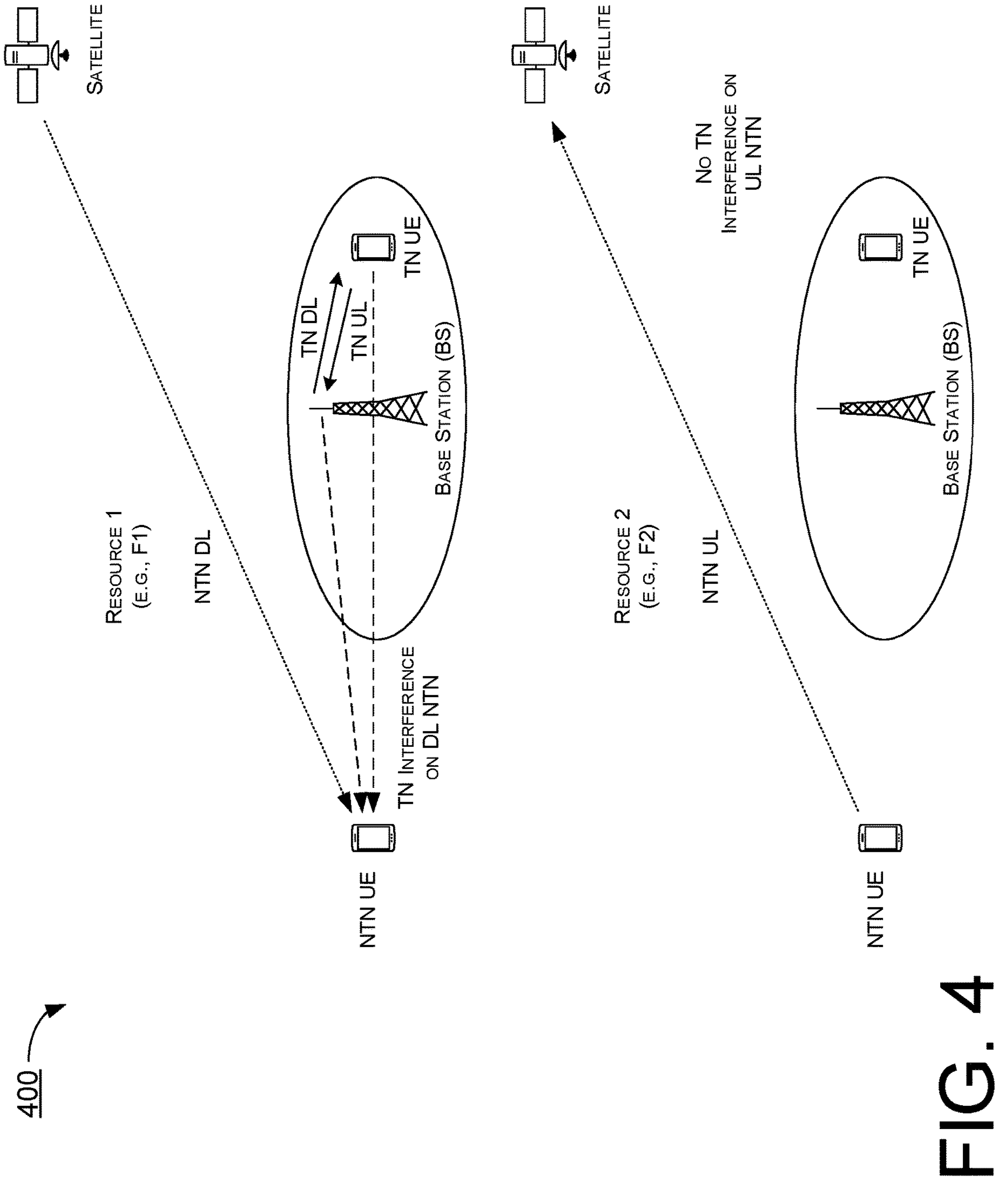
FIG. 4 is a diagram of an example scenario under a proposed scheme in accordance with the present disclosure.

FIG. 4 illustrates an example scenario 400 under a proposed scheme with respect to half-band pairing in accordance with the present disclosure. Under the proposed scheme, NTN DL transmissions and TN DL and UL transmissions may share the same resources. Conversely, NTN UL transmissions do not share resources with TN transmissions. The resources may include time resource(s) (e.g., frame(s), slot(s), symbol(s), and so on) and/or frequency resource(s) (e.g., BWP(s), resource block(s), frequency band(s), and so on).

Under the proposed scheme, half-band pairing may be implemented with the use of FDD and/or time-division duplexing (TDD) system pairing. For instance, a first frequency (herein interchangeably referred to as "F1") may be used for NTN FDD DL transmissions and TN TDD DL and UL transmissions, and a second frequency (herein interchangeably referred to as "F2") may be used for NTN FDD UL transmissions only. Under the proposed scheme, two frequency bands may be defined for the same pair TN/NTN. For instance, a first frequency band (Band 1) may be defined for NTN, FDD with DL transmissions on F1 and UL transmissions on F2. Similarly, a second frequency band (Band 2) may be defined for TN, TDD with both DL and UL transmissions on F1. Moreover, half-band pairing may apply as well to partial overlapping of the FDD/TDD bands. Under the proposed scheme, the mobility management using measurement(s) of the DL signal of TN and NTN may allow the UE to select the system with the largest signal quality, thereby reducing the impact of TN-NTN interference.

FIG. 5 illustrates an example scenario 500 under a proposed scheme with respect to half-band pairing in accordance with the present disclosure. Specifically, FIG. 5 shows an illustrative and non-limiting example of application of the concept of half-band pairing for TN and NTN. Under the proposed scheme, NTN frequency tables may be specified to support NTN system operation. Additionally, FDD NTN band 24 (may share the half-band pairing of TN EARFCN TDD band 24' also known as TN band X). That is, the DL frequency of NTN may share the same frequency of TN. Moreover, NTN (FDD) DL and TN (TDD) DL/UL may share the same or different numbering for the absolute radio-frequency channel number (ARFCN). The NTN and legacy systems may include, but are not limited to, 2G, 3G, 4G LTE and 5G NR. The signaling of NTN frequency band indication may be in accordance with NTN frequency band specification.

Figure 6:
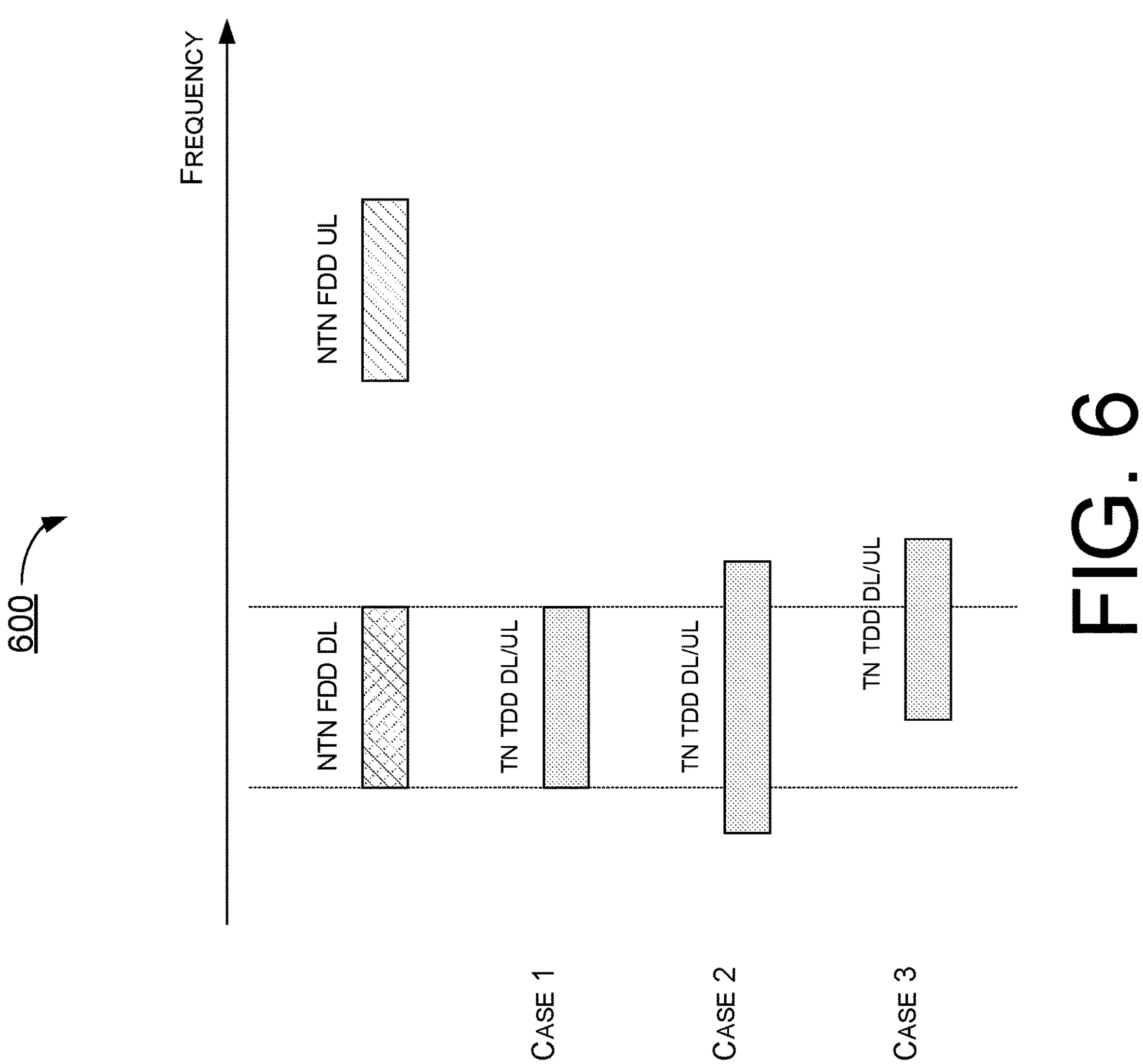
FIG. 6 is a diagram of an example scenario under a proposed scheme in accordance with the present disclosure.

FIG. 6 illustrates an example scenario 600 under a proposed scheme with respect to half-band overlapping configuration in accordance with the present disclosure. Under the proposed scheme, the frequency bandwidth used for NTN FDD DL transmissions and TN TDD in the half-band pairing between TN and NTN may be identical although the frequency bandwidth may as well be partially overlapping as shown in FIG. 6. In scenario 600, three cases of half-band overlapping are shown as illustrative examples. In a first case (Case 1), NTN FDD DL and TN TDD have the same frequency allocation. In a second case (Case 2), TN and NTN DL have different frequency allocations but with NTN DL frequency allocation fully overlapped by the TN frequency allocation (and with TN frequency allocation partially overlapped by NTN DL frequency allocation). It is noteworthy that an inverse scenario, in which TN frequency allocation is fully overlapped by the NTN DL frequency allocation, is also possible. In a third case (Case 3), TN frequency allocation is partially overlapped by the NTN frequency allocation. Under the proposed scheme, the different configurations of overlapping and bandwidth sizes may lead to different bands defined for the half-band pairing between TN and NTN covering the same frequency range.

Figure 7:
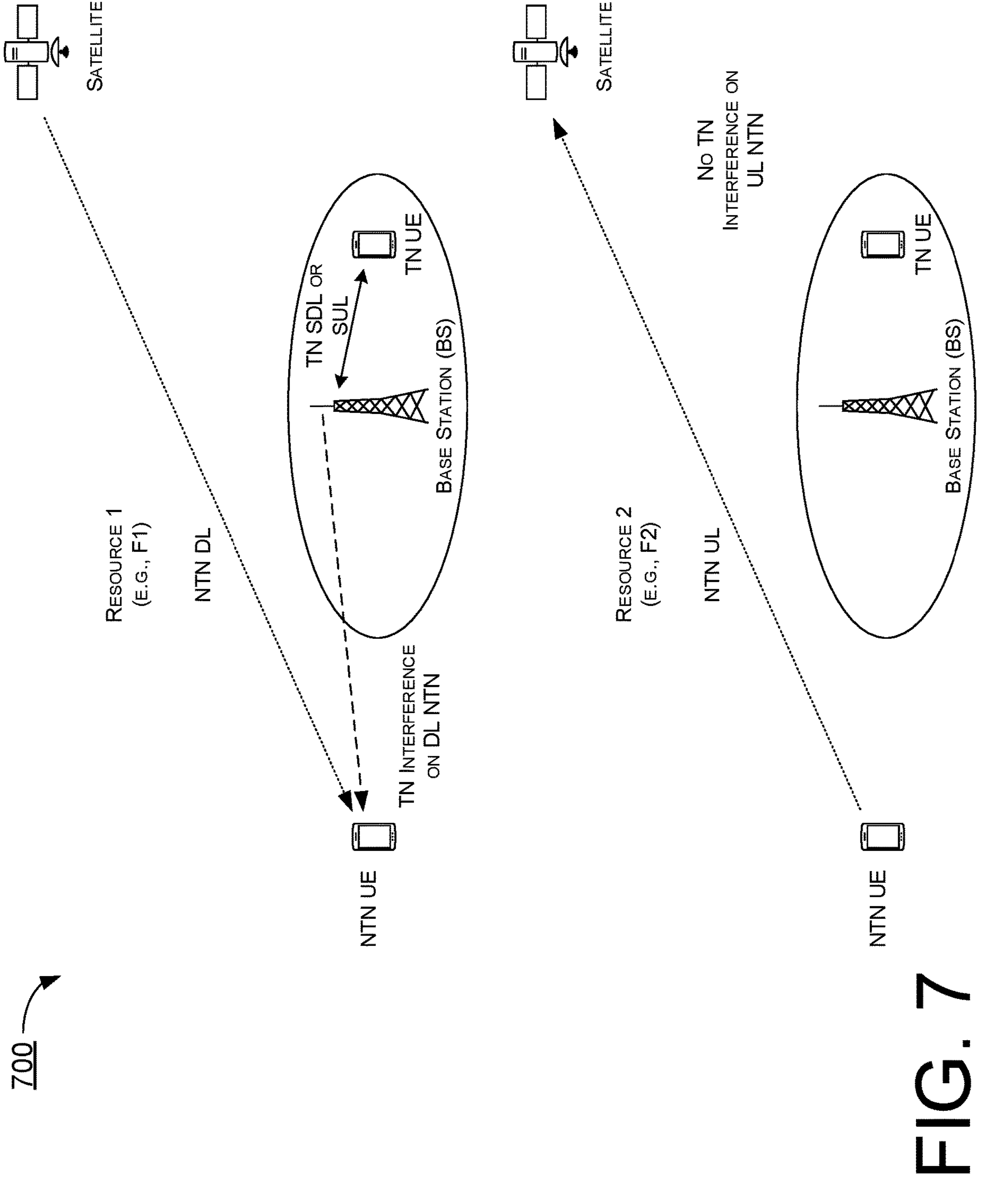
FIG. 7 is a diagram of an example scenario under a proposed scheme in accordance with the present disclosure.

FIG. 7 illustrates an example scenario 700 under a proposed scheme with respect to supplemental carrier on half-paired bands in accordance with the present disclosure. Under the proposed scheme, NTN DL transmissions and TN supplemental carrier DL (SDL) or supplemental carrier UL (SUL) transmissions may share the same resources. Conversely, NTN UL transmissions do not share resources with TN transmissions. The resources may include time resource (s) (e.g., frame(s), slot(s), symbol(s), and so on) and/or frequency resource(s) (e.g., BWP(s), resource block(s), frequency band(s), and so on).

Under the proposed scheme, SDL half-band pairing may be implemented with a first frequency (herein interchangeably referred to as "F1") used for NTN FDD DL transmissions and TN SDL or SUL transmissions. Similarly, SDL half-band pairing may be implemented with a second frequency (herein interchangeably referred to as "F2") used for NTN FDD UL transmissions only. Under the proposed scheme, two frequency bands may be defined for the same pair TN/NTN. For instance, a first frequency band (Band 1) may be defined for NTN, FDD with DL transmissions on F1 and UL transmissions on F2. Similarly, a second frequency band (Band 2) may be defined for TN, SDL or SUL transmissions on F1. Moreover, half-band pairing may apply as well to partial overlapping of the FDD and SDL or SUL bands. Under the proposed scheme, as with half-band pairing, exemplary definition of SDL or SUL band may be applied in the same way as for TDD.

Illustrative Implementations

Figure 8:
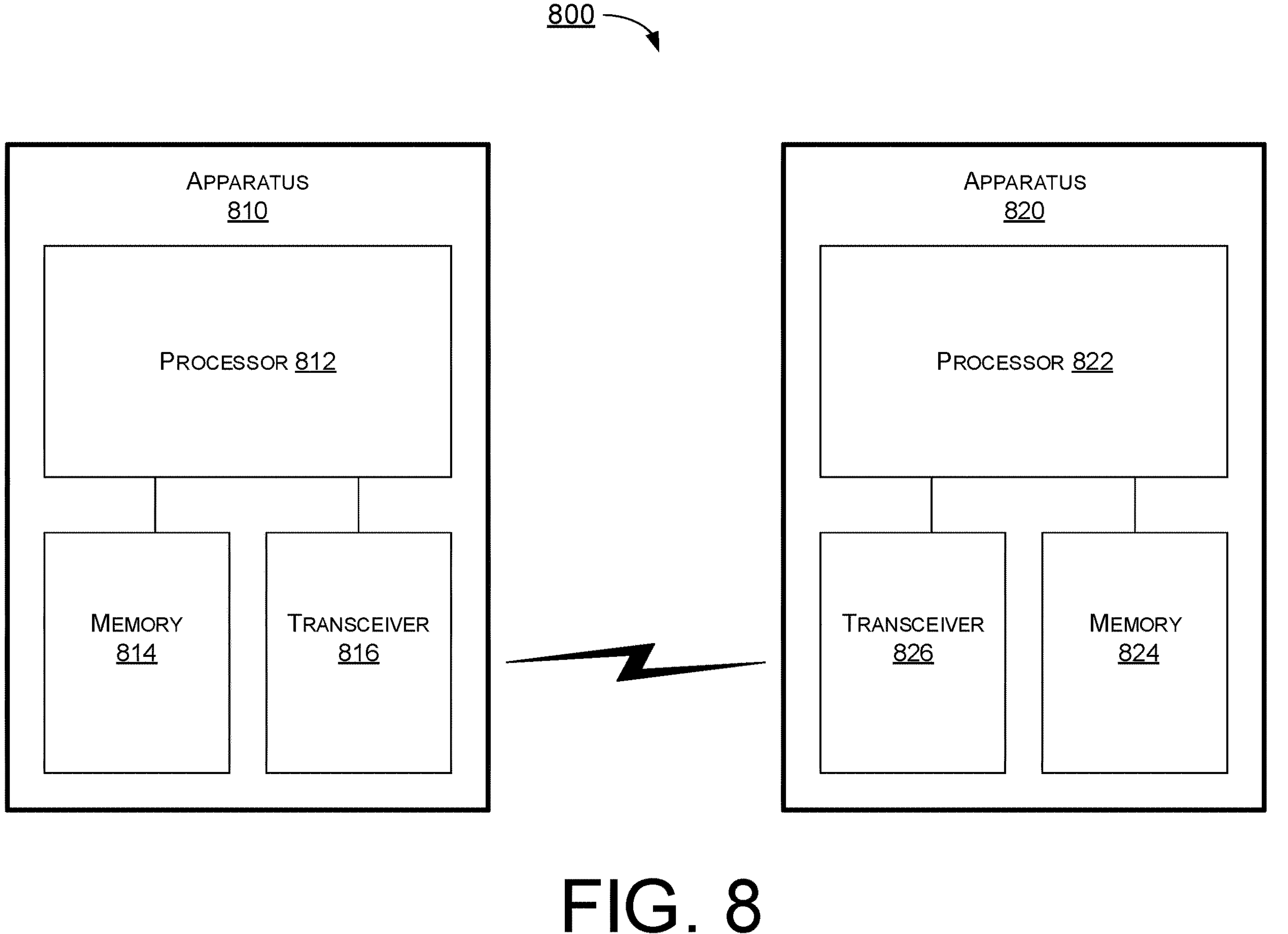
FIG. 8 is a block diagram of an example communication system in accordance with an implementation of the present disclosure.

FIG. 8 illustrates an example communication system 800 having an example apparatus 810 and an example apparatus 820 in accordance with an implementation of the present disclosure. Each of apparatus 810 and apparatus 820 may perform various functions to implement schemes, techniques, processes and methods described herein pertaining to configuration of spectrum sharing between a TN and a NTN, including scenarios/schemes described above as well as process(es) described below.

Apparatus 810 may be a part of an electronic apparatus, which may be a UE such as a portable or mobile apparatus, a wearable apparatus, a wireless communication apparatus or a computing apparatus. For instance, apparatus 810 may be implemented in a smartphone, a smartwatch, a personal digital assistant, a digital camera, or a computing equipment such as a tablet computer, a laptop computer or a notebook computer. Apparatus 810 may also be a part of a machine type apparatus, which may be an IoT, NB-IoT, IIoT or NTN apparatus such as an immobile or a stationary apparatus, a home apparatus, a wire communication apparatus or a computing apparatus. For instance, apparatus 810 may be implemented in a smart thermostat, a smart fridge, a smart door lock, a wireless speaker or a home control center. Alternatively, apparatus 810 may be implemented in the form of one or more integrated-circuit (IC) chips such as, for example and without limitation, one or more single-core processors, one or more multi-core processors, one or more reduced-instruction set computing (RISC) processors, or one or more complex-instruction-set-computing (CISC) processors. Apparatus 810 may include at least some of those components shown in FIG. 8 such as a processor 812, for example. Apparatus 810 may further include one or more other components not pertinent to the proposed scheme of the present disclosure (e.g., internal power supply, display device and/or user interface device), and, thus, such component(s) of apparatus 810 are neither shown in FIG. 8 nor described below in the interest of simplicity and brevity.

Apparatus 820 may be a part of an electronic apparatus/station, which may be a network node such as a base station, a small cell, a router, a gateway or a satellite. For instance, apparatus 820 may be implemented in an eNodeB in an LTE, in a gNB in a 5G, NR, IoT, NB-IoT, IIoT, or in a satellite in an NTN network. Alternatively, apparatus 820 may be implemented in the form of one or more IC chips such as, for example and without limitation, one or more single-core processors, one or more multi-core processors, or one or more RISC or CISC processors. Apparatus 820 may include at least some of those components shown in FIG. 8 such as a processor 822, for example. Apparatus 820 may further include one or more other components not pertinent to the proposed scheme of the present disclosure (e.g., internal power supply, display device and/or user interface device), and, thus, such component(s) of apparatus 820 are neither shown in FIG. 8 nor described below in the interest of simplicity and brevity.

In one aspect, each of processor 812 and processor 822 may be implemented in the form of one or more single-core processors, one or more multi-core processors, one or more RISC processors, or one or more CISC processors. That is, even though a singular term "a processor" is used herein to refer to processor 812 and processor 822, each of processor 812 and processor 822 may include multiple processors in some implementations and a single processor in other implementations in accordance with the present disclosure. In another aspect, each of processor 812 and processor 822 may be implemented in the form of hardware (and, optionally, firmware) with electronic components including, for example and without limitation, one or more transistors, one or more diodes, one or more capacitors, one or more resistors, one or more inductors, one or more memristors and/or one or more varactors that are configured and arranged to achieve specific purposes in accordance with the present disclosure. In other words, in at least some implementations, each of processor 812 and processor 822 is a special-purpose machine specifically designed, arranged and configured to perform specific tasks including configuration of spectrum sharing between a TN and a NTN in accordance with various implementations of the present disclosure.

In some implementations, apparatus 810 may also include a transceiver 816 coupled to processor 812 and capable of wirelessly transmitting and receiving data. In some implementations, apparatus 810 may further include a memory 814 coupled to processor 812 and capable of being accessed by processor 812 and storing data therein. In some implementations, apparatus 820 may also include a transceiver 826 coupled to processor 822 and capable of wirelessly transmitting and receiving data. In some implementations, apparatus 820 may further include a memory 824 coupled to processor 822 and capable of being accessed by processor 822 and storing data therein. Accordingly, apparatus 810 and apparatus 820 may wirelessly communicate with each other via transceiver 816 and transceiver 826, respectively.

Each of apparatus 810 and apparatus 820 may be a communication entity capable of communicating with each other using various proposed schemes in accordance with the present disclosure. To aid better understanding, the following description of the operations, functionalities and capabilities of each of apparatus 810 and apparatus 820 is provided in the context of a mobile communication environment in which apparatus 810 is implemented in or as a communication apparatus or a UE (e.g., NTN UE) and apparatus 820 is implemented in or as a network node or base station (e.g., NT network node such as a satellite) of a communication network (e.g., NTN). It is also noteworthy that, although the example implementations described below are provided in the context of mobile communications, the same may be implemented in other types of networks.

Under some proposed schemes pertaining to configuration of spectrum sharing between a TN and a NTN in accordance with the present disclosure, with apparatus 810 implemented in or as an NTN UE and apparatus 820 implemented in or as an NT network node (e.g., satellite) in an NTN, processor 812 may communicate, via transceiver 816, with apparatus 820 of an NTN by resource sharing with a TN. The resource sharing may involve resource sharing with pairing of UL and DL transmissions of the NTN and the TN.

In some implementations, the pairing of the UL and DL transmissions of the NTN and the TN may include pairing of the UL and DL transmissions of the NTN and the TN such that: (a) an NTN DL transmission and a TN UL transmission share a first resource; and (b) a NTN UL transmission and a TN DL transmission share a second resource.

In some implementations, the pairing of the UL and DL transmissions of the NTN and the TN may involve reverse pairing the UL and DL transmissions of the NTN and the TN with same frequency bands such that: (i) for the NTN, an NTN DL transmission is performed on a first frequency (F1) and an NTN UL transmission is performed on a second frequency (F2); and (ii) for the TN, a TN DL transmission is performed on the F2 and a TN UL transmission is performed on the F1.

In some implementations, the reverse pairing of the UL and DL transmissions of the NTN and the TN may involve reverse pairing of the UL and DL transmissions of the NTN and the TN with partially overlapping frequency bands.

In some implementations, the resource sharing with the TN may involve resource sharing with a base station of the TN which is configured to support NTN-TN spectrum sharing on reverse pairing frequency bands.

In some implementations, the pairing of the UL and DL transmissions of the NTN and the TN may involve half-band pairing the UL and DL transmissions of the NTN and the TN with a same frequency allocation such that: (i) for the NTN, an NTN FDD DL transmission is performed on a first frequency (F1) and an NTN FDD UL transmission is performed on a second frequency (F2); and (ii) for the TN, a TN TDD DL transmission is performed on the F1 and a TN TDD UL transmission is also performed on the F1.

In some implementations, the half-band pairing of the UL and DL transmissions of the NTN and the TN may involve half-band pairing of the UL and DL transmissions of the NTN and the TN with partially overlapping frequency bands.

In some implementations, the pairing of the UL and DL transmissions of the NTN and the TN may involve supplemental carrier half-band pairing the UL and DL transmissions of the NTN and the TN with a same frequency allocation such that: (i) a first frequency (F1) is utilized in an NTN FDD DL transmission and a TN SDL transmission or SUL transmission; and (ii) a second frequency (F2) is utilized in an NTN FDD UL transmission.

In some implementations, the TN SDL transmission or SUL transmission may be performed on a supplemental carrier.

In some implementations, the supplemental carrier half-band pairing of the UL and DL transmissions of the NTN and the TN may involve supplemental carrier half-band pairing of the UL and DL transmissions of the NTN and the TN with partially overlapping frequency bands.

In some implementations, the supplemental carrier half-band pairing of the UL and DL transmissions of the NTN and the TN may involve applying supplemental carrier half-paired frequency bands to a TN supplemental carrier and the NTN FDD transmissions covering a same frequency allocation on an NTN UL transmission and the supplemental carrier.

Illustrative Processes

FIG. 9 illustrates an example process 900 in accordance with an implementation of the present disclosure. Process 900 may be an example implementation of schemes described above whether partially or completely, with respect to configuration of spectrum sharing between a TN and a NTN in accordance with the present disclosure. Process 900 may represent an aspect of implementation of features of apparatus 810 and/or apparatus 820. Process 900 may include one or more operations, actions, or functions as illustrated by block 910. Although illustrated as discrete blocks, various blocks of process 900 may be divided into additional blocks, combined into fewer blocks, or eliminated, depending on the desired implementation. Moreover, the blocks of process 900 may executed in the order shown in FIG. 9 or, alternatively, in a different order. Process 900 may be implemented by apparatus 810 or any suitable UE or machine type devices. Solely for illustrative purposes and without limitation, process 900 is described below in the context of apparatus 810 implemented in or as an NTN UE and apparatus 820 implemented in or as an NT network node such as a satellite. Process 900 may begin at block 910.

At 910, process 900 may involve processor 812 of apparatus 810 as UE 110 communicating, via transceiver 816, with apparatus 820 as an NT network node (e.g., a satellite) of an NTN by resource sharing with a TN. The resource sharing may involve resource sharing with pairing of UL and DL transmissions of the NTN and the TN.

In some implementations, the pairing of the UL and DL transmissions of the NTN and the TN may include pairing of the UL and DL transmissions of the NTN and the TN such that: (a) an NTN DL transmission and a TN UL transmission share a first resource; and (b) a NTN UL transmission and a TN DL transmission share a second resource.

In some implementations, the pairing of the UL and DL transmissions of the NTN and the TN may involve reverse pairing the UL and DL transmissions of the NTN and the TN with same frequency bands such that: (i) for the NTN, an NTN DL transmission is performed on a first frequency (F1) and an NTN UL transmission is performed on a second frequency (F2); and (ii) for the TN, a TN DL transmission is performed on the F2 and a TN UL transmission is performed on the F1.

In some implementations, the reverse pairing of the UL and DL transmissions of the NTN and the TN may involve reverse pairing of the UL and DL transmissions of the NTN and the TN with partially overlapping frequency bands.

In some implementations, the resource sharing with the TN may involve resource sharing with a base station of the TN which is configured to support NTN-TN spectrum sharing on reverse pairing frequency bands.

In some implementations, the pairing of the UL and DL transmissions of the NTN and the TN may involve half-band pairing the UL and DL transmissions of the NTN and the TN with a same frequency allocation such that: (i) for the NTN, an NTN FDD DL transmission is performed on a first frequency (F1) and an NTN FDD UL transmission is performed on a second frequency (F2); and (ii) for the TN, a TN TDD DL transmission is performed on the F1 and a TN TDD UL transmission is also performed on the F1.

In some implementations, the half-band pairing of the UL and DL transmissions of the NTN and the TN may involve half-band pairing of the UL and DL transmissions of the NTN and the TN with partially overlapping frequency bands.

In some implementations, the pairing of the UL and DL transmissions of the NTN and the TN may involve supplemental carrier half-band pairing the UL and DL transmissions of the NTN and the TN with a same frequency allocation such that: (i) a first frequency (F1) is utilized in an NTN FDD DL transmission and a TN SDL transmission or SUL transmission; and (ii) a second frequency (F2) is utilized in an NTN FDD UL transmission.

In some implementations, the TN SDL transmission or SUL transmission may be performed on a supplemental carrier.

In some implementations, the supplemental carrier half-band pairing of the UL and DL transmissions of the NTN and the TN may involve supplemental carrier half-band pairing of the UL and DL transmissions of the NTN and the TN with partially overlapping frequency bands.

In some implementations, the supplemental carrier half-band pairing of the UL and DL transmissions of the NTN and the TN may involve applying supplemental carrier half-paired frequency bands to a TN supplemental carrier and the NTN FDD transmissions covering a same frequency allocation on an NTN UL transmission and the supplemental carrier.

ADDITIONAL NOTES

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Further, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Moreover, it will be understood by those skilled in the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various implementations of the present disclosure have been described herein for purposes of illustration, and that various modifications may be made without departing from the scope and spirit of the present disclosure. Accordingly, the various implementations disclosed herein are not intended to be limiting, with the true scope and spirit being indicated by the following claims.

What is claimed is:

1. A method, comprising:

communicating, by a processor of a non-terrestrial network (NTN) user equipment (UE), with a non-terrestrial (NT) network node of an NTN by resource sharing with a terrestrial network (TN), communicating, by a processor of a TN UE, with the TN by sharing with the NTN, wherein the resource sharing comprises resource sharing with pairing of uplink (UL) and downlink (DL) transmissions of the NTN and the TN;

wherein the pairing of the UL and DL transmissions of the NTN and the TN comprises pairing of the UL and DL transmissions of the NTN and the TN such that at least one of the two cases:

an NTN DL transmission with respect to the NTN UE and a TN UL transmission with respect to the TN UE share a first resource; or a NTN UL transmission with respect to the NTN UE and a TN DL transmission with respect to the TN UE share a second resource.

2. The method of claim 1, wherein the pairing of the UL and DL transmissions of the NTN and the TN comprises reverse pairing the UL and DL transmissions of the NTN and the TN with same frequency bands such that:

for the NTN, an NTN DL transmission is performed on a first frequency (F1) and an NTN UL transmission is performed on a second frequency (F2); and for the TN, a TN DL transmission is performed on the F2 and a TN UL transmission is performed on the F1.

3. The method of claim 2, wherein the reverse pairing of the UL and DL transmissions of the NTN and the TN comprises reverse pairing of the UL and DL transmissions of the NTN and the TN with partially overlapping frequency bands.

4. The method of claim 1, wherein the resource sharing with the TN comprises resource sharing with a base station of the TN which is configured to support NTN-TN spectrum sharing on reverse pairing frequency bands.

5. The method of claim 1, wherein the pairing of the UL and DL transmissions of the NTN and the TN comprises half-band pairing the UL and DL transmissions of the NTN and the TN with a same frequency allocation such that:

for the NTN, an NTN frequency-division duplexing (FDD) DL transmission is performed on a first frequency (F1) and an NTN FDD UL transmission is performed on a second frequency (F2); and for the TN, a TN time-division duplexing (TDD) DL transmission is performed on the F1 and a TN TDD UL transmission is also performed on the F1.

6. The method of claim 5, wherein the half-band pairing of the UL and DL transmissions of the NTN and the TN comprises half-band pairing of the UL and DL transmissions of the NTN and the TN with partially overlapping frequency bands.

7. The method of claim 1, wherein the pairing of the UL and DL transmissions of the NTN and the TN comprises supplemental carrier half-band pairing the UL and DL transmissions of the NTN and the TN with a same frequency allocation such that:

a first frequency (F1) is utilized in an NTN frequency-division duplexing (FDD) DL transmission and a TN supplemental DL (SDL) transmission or supplemental UL (SUL) transmission; and a second frequency (F2) is utilized in an NTN FDD UL transmission.

8. The method of claim 7, wherein the TN SDL transmission or SUL transmission is performed on a supplemental carrier.

9. The method of claim 7, wherein the supplemental carrier half-band pairing of the UL and DL transmissions of the NTN and the TN comprises supplemental carrier half-band pairing of the UL and DL transmissions of the NTN and the TN with partially overlapping frequency bands.

10. The method of claim 7, wherein the supplemental carrier half-band pairing of the UL and DL transmissions of the NTN and the TN comprises applying supplemental carrier half-paired frequency bands to a TN supplemental carrier and the NTN FDD transmissions covering a same frequency allocation on an NTN UL transmission and the supplemental carrier.

11. An apparatus implementable in a non-terrestrial network (NTN) user equipment (UE), comprising:

a transceiver configured to communicate wirelessly; and a processor coupled to the transceiver and configured to communicate, via the transceiver, with a non-terrestrial (NT) network node of an NTN by resource sharing with a terrestrial network (TN), wherein a TN UE is configured to communicate with the TN by sharing with the NTN, wherein the resource sharing comprises resource sharing with pairing of uplink (UL) and downlink (DL) transmissions of the NTN and the TN;

wherein the pairing of the UL and DL transmissions of the NTN and the TN comprises pairing of the UL and DL transmissions of the NTN and the TN such that at least one of the two cases:

an NTN DL transmission with respect to the NTN UE and a TN UL transmission with respect to the TN UE share a first resource; or a NTN UL transmission with respect to the NTN UE and a TN DL transmission with respect to the TN UE share a second resource.

12. The apparatus of claim 11, wherein the pairing of the UL and DL transmissions of the NTN and the TN comprises reverse pairing the UL and DL transmissions of the NTN and the TN with same frequency bands such that:

for the NTN, an NTN DL transmission is performed on a first frequency (F1) and an NTN UL transmission is performed on a second frequency (F2); and for the TN, a TN DL transmission is performed on the F2 and a TN UL transmission is performed on the F1.

13. The apparatus of claim 12, wherein the reverse pairing of the UL and DL transmissions of the NTN and the TN comprises reverse pairing of the UL and DL transmissions of the NTN and the TN with partially overlapping frequency bands.

14. The apparatus of claim 11, wherein the resource sharing with the TN comprises resource sharing with a base station of the TN which is configured to support NTN-TN spectrum sharing on reverse pairing frequency bands.

15. The apparatus of claim 11, wherein the pairing of the UL and DL transmissions of the NTN and the TN comprises half-band pairing the UL and DL transmissions of the NTN and the TN with a same frequency allocation such that:

for the NTN, an NTN frequency-division duplexing (FDD) DL transmission is performed on a first frequency (F1) and an NTN FDD UL transmission is performed on a second frequency (F2); and for the TN, a TN time-division duplexing (TDD) DL transmission is performed on the F1 and a TN TDD UL transmission is also performed on the F1.

16. The apparatus of claim 15, wherein the half-band pairing of the UL and DL transmissions of the NTN and the TN comprises half-band pairing of the UL and DL transmissions of the NTN and the TN with partially overlapping frequency bands.

17. The apparatus of claim 11, wherein the pairing of the UL and DL transmissions of the NTN and the TN comprises supplemental carrier half-band pairing the UL and DL transmissions of the NTN and the TN with a same frequency allocation such that:

a first frequency (F1) is utilized in an NTN frequency-division duplexing (FDD) DL transmission and a TN supplemental DL (SDL) transmission or supplemental UL (SUL) transmission; and a second frequency (F2) is utilized in an NTN FDD UL transmission, wherein the TN SDL transmission or SUL transmission is performed on a supplemental carrier.

18. The apparatus of claim 17, wherein the supplemental carrier half-band pairing of the UL and DL transmissions of the NTN and the TN comprises supplemental carrier half-band pairing of the UL and DL transmissions of the NTN and the TN with partially overlapping frequency bands.

* * * * *